O. A. SMITH.
HEXAGONAL MILLING MACHINE.
APPLICATION FILED MAY 12, 1911.

1,033,837.

Patented July 30, 1912.
6 SHEETS—SHEET 1.

Witnesses:
R. W. Pittman
George F. Purcell

Inventor
Oscar A. Smith.
By his Attorney

O. A. SMITH.
HEXAGONAL MILLING MACHINE.
APPLICATION FILED MAY 12, 1911.

1,033,837.

Patented July 30, 1912.
6 SHEETS—SHEET 4.

Witnesses:
R. W. Pittman
George F. Purcell

Inventor
Oscar A. Smith
By his Attorney

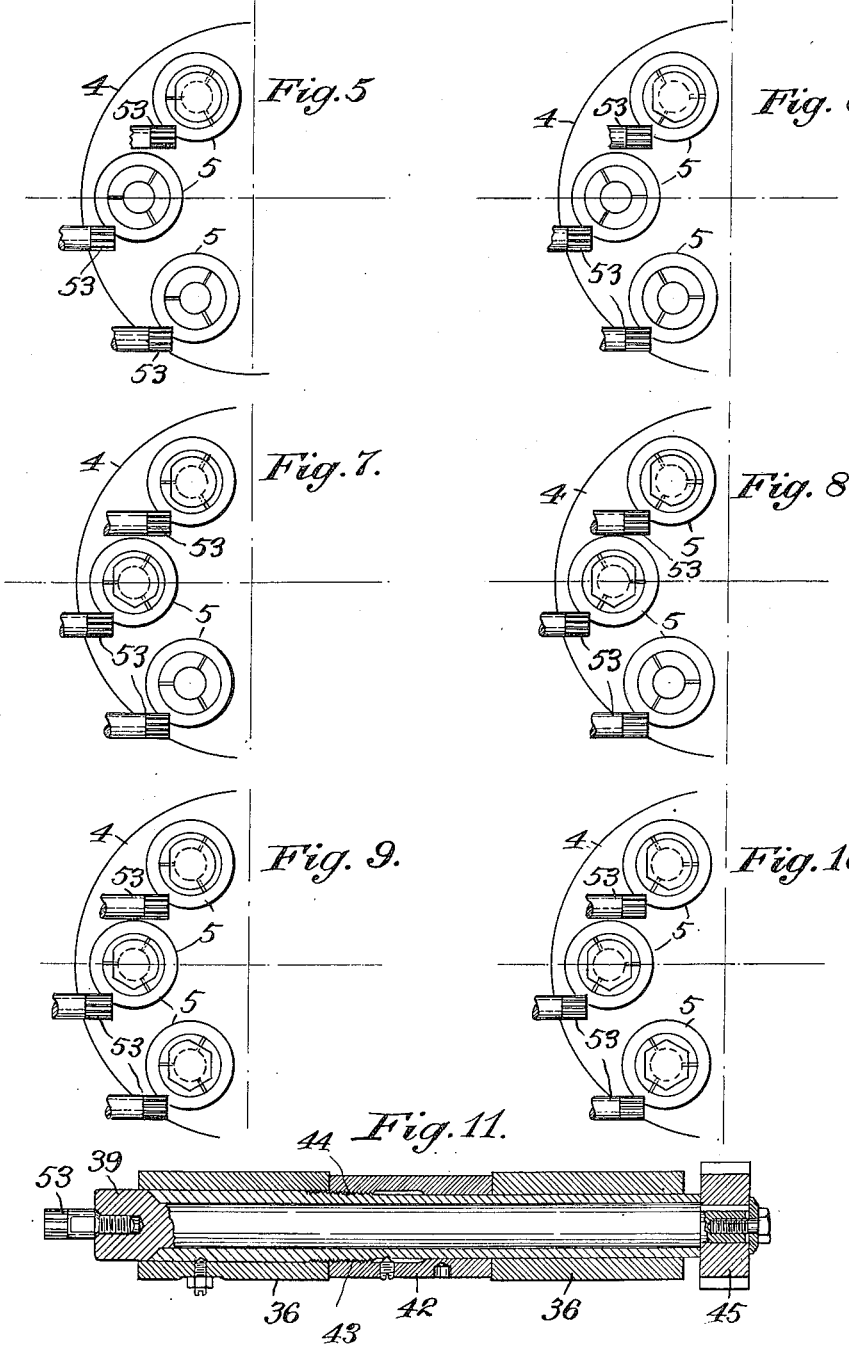

O. A. SMITH.
HEXAGONAL MILLING MACHINE.
APPLICATION FILED MAY 12, 1911.
1,033,837.
Patented July 30, 1912.
6 SHEETS—SHEET 6.
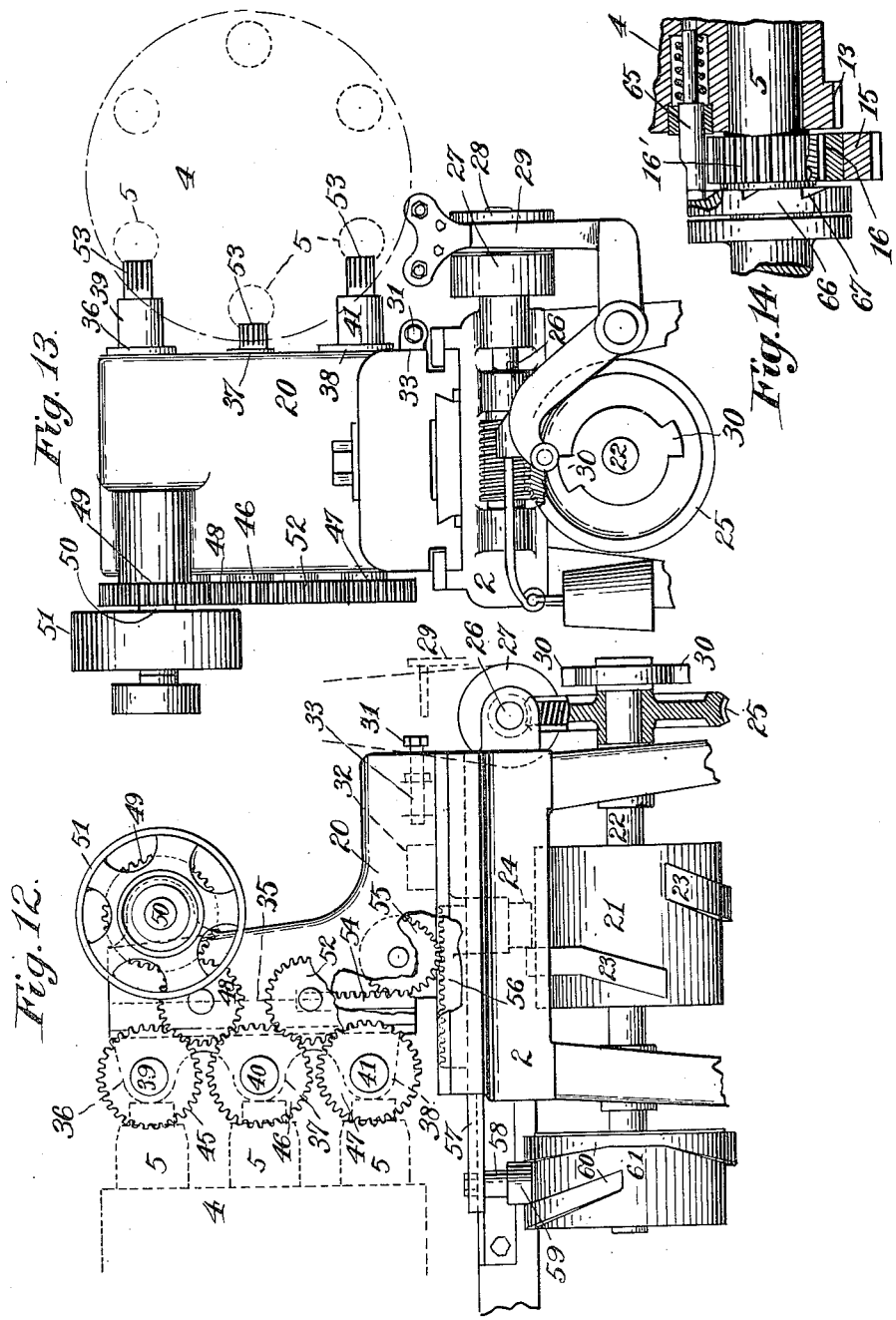
Witnesses:
Inventor
Oscar A. Smith
By his Attorney

UNITED STATES PATENT OFFICE.

OSCAR A. SMITH, OF CLEVELAND, OHIO, ASSIGNOR TO THE NATIONAL-ACME MANUFACTURING COMPANY, OF CLEVELAND, OHIO, A CORPORATION OF OHIO.

HEXAGONAL MILLING-MACHINE.

1,033,837.    Specification of Letters Patent.    Patented July 30, 1912.

Application filed May 12, 1911. Serial No. 626,698.

*To all whom it may concern:*

Be it known that I, OSCAR A. SMITH, a citizen of the United States, residing at Cleveland, in the county of Cuyahoga and State of Ohio, have invented certain new and useful Improvements in Hexagonal Milling-Machines, of which the following is a specification.

This invention relates to metal working machines, and more particularly to milling machines, the object thereof being to provide a machine of this class for milling hexagonal stock, such as nuts for use with spark plugs and other devices, and therefore herein designated a hexagonal milling machine, the present improvement embodying a revoluble turret carrying intermittently rotatable stock or work spindles and a sliding milling tool carrier having a series of milling tools movable up and down or transversely of the axis of the stock, and in which improvement the milling tools will have a rapid movement in one direction and a relatively slow movement in the opposite direction and at predetermined periods will be shifted away from the stock to permit the indexing of the turret, and in which also the milling tools are so located relatively to each other that three pieces of stock will be simultaneously milled, each however in a different position, while each piece of stock will have two milling operations performed thereon by the same milling tool after each indexing of the turret, so that in the present improvement six milling operations are performed on the stock of three of the work spindles while the turret is indexed but three times, all of such milling operations being performed, in the embodiment shown, upon the stock carried by the spindles located during such milling operations at one side of the turret, thus facilitating other operations upon the stock carried by the spindles at the opposite side of the turret.

Figure 1:
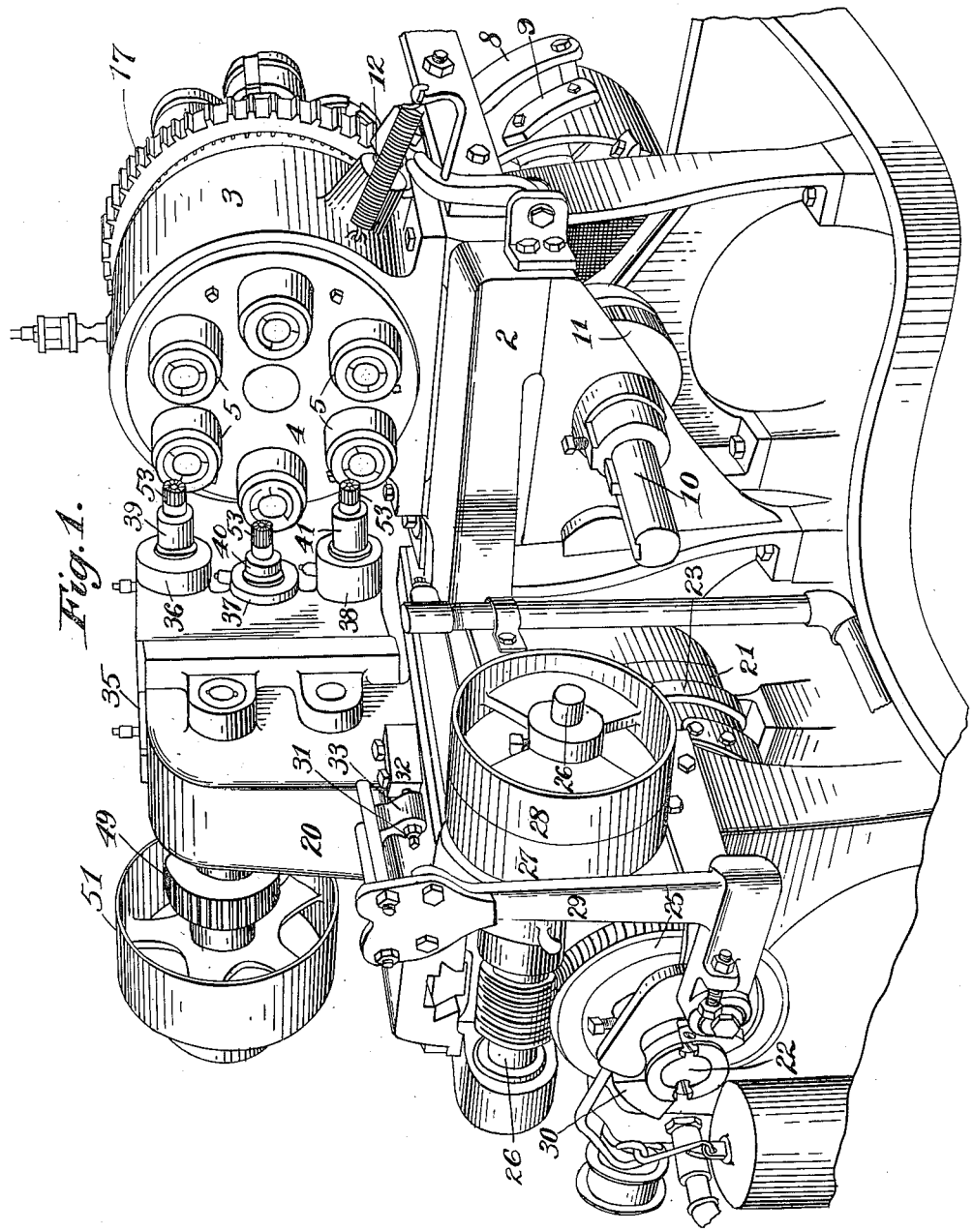
Figure 2:
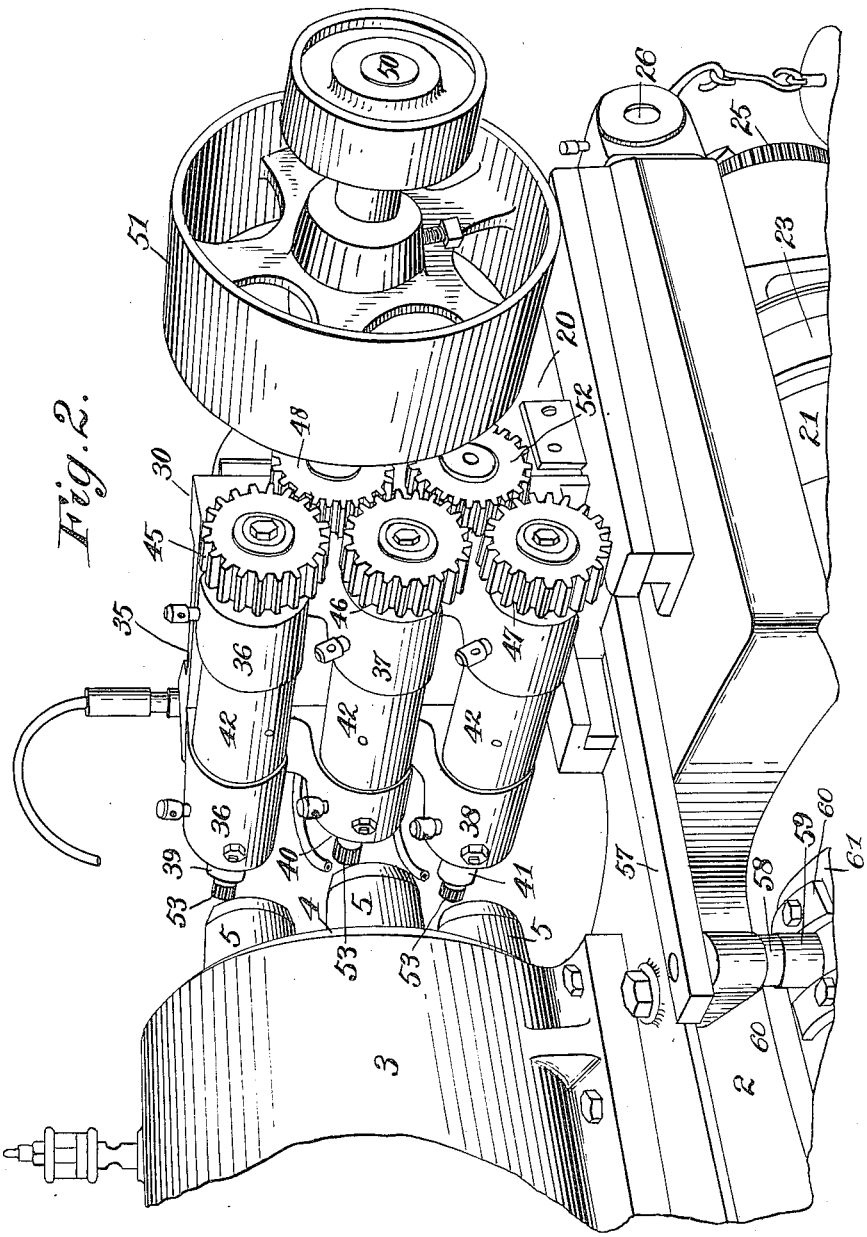
Figure 3:
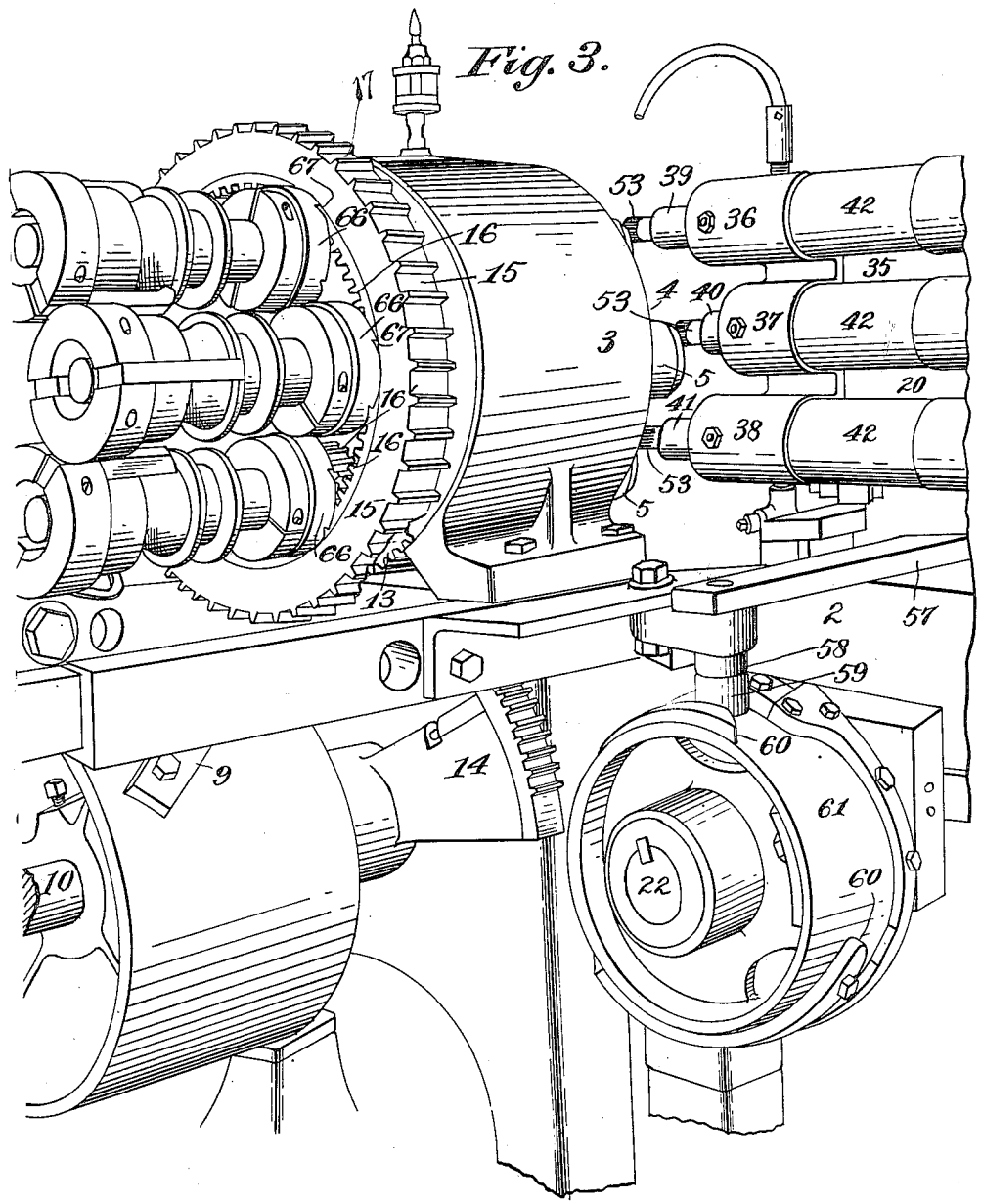
Figure 4:
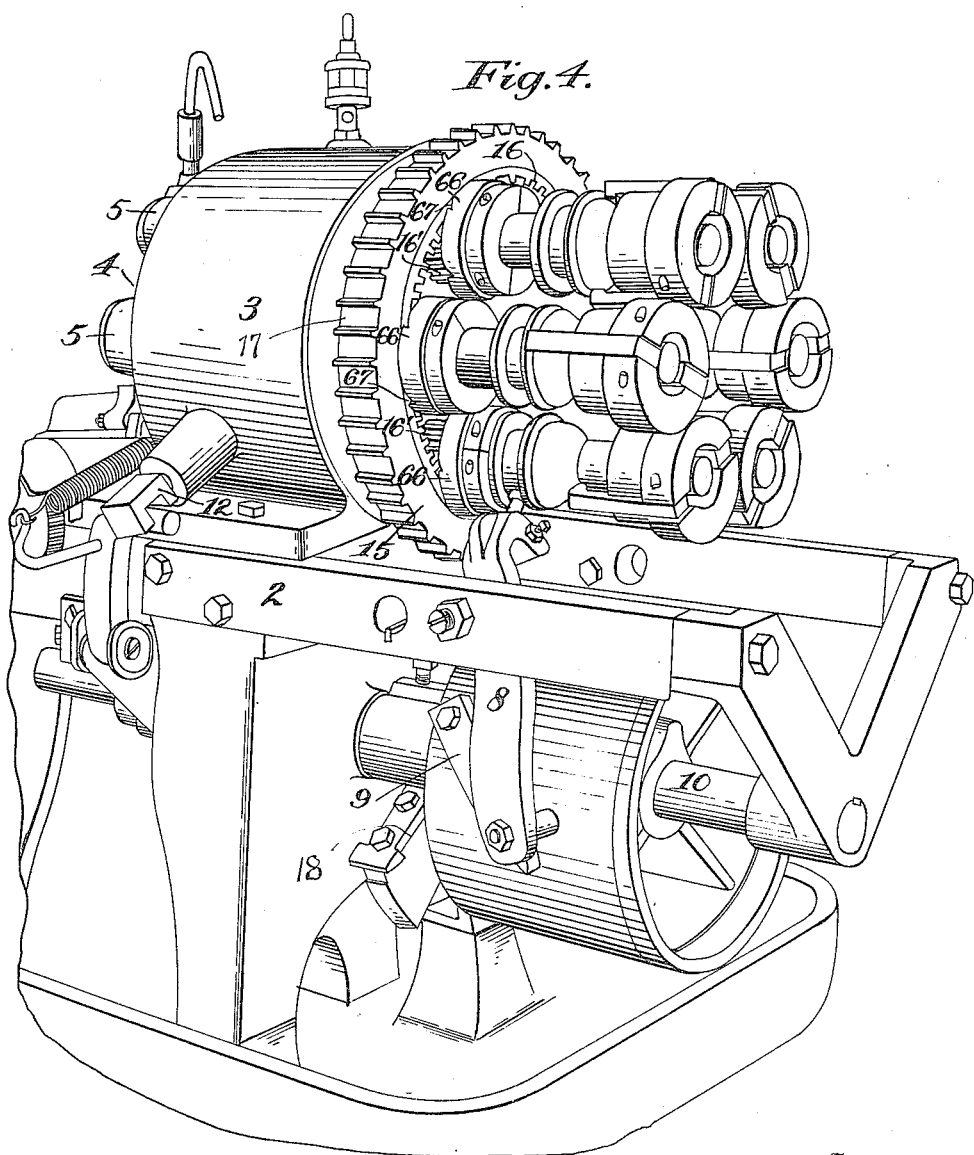

In the drawings accompanying and forming part of this specification, Figure 1 is a perspective view of this improved hexagonal milling machine; Fig. 2 is a perspective view of the same from a different position; Fig. 3 is a perspective view thereof from still a different position; Fig. 4 is a perspective view of the rear end of the machine; Figs. 5 to 10 are views illustrating the different positions of the work spindles during the milling operations; Fig. 11 is a sectional view illustrating one of the milling tools and the means for supporting the same; Fig. 12 is a view illustrating the means for rotating the milling tools and for raising and lowering the same; Fig. 13 is an end view looking from right to left of the mechanism shown in Fig. 12; and Fig. 14 is a view illustrating a means for locking the work spindles in their milling positions.

Similar characters of reference indicate corresponding parts throughout the figures of the drawings.

In the present embodiment of this improved hexagonal milling machine the several mechanisms are mounted upon a suitable base 2. The revoluble turret mechanism comprises a turret casing 3 bolted to the base and in which is mounted a revoluble turret 4, carrying a series of parallelly located work or stock spindles 5 provided with suitable chucking mechanism for holding the work or stock, and which chucking mechanism of each of the spindles is operated by suitable means as the turret is brought into a predetermined position to permit placing the stock in the chuck, this means comprising a lever 8 operated by a cam 9 mounted upon a shaft 10 receiving motion through suitable gearing a part only of which, as 11, is shown. This revoluble turret is locked in its indexed positions by a suitable spring actuated bolt 12 which is released at the proper intervals by suitable cam mechanism carried upon the shaft 10.

For indexing the turrret it is shown provided with a gear 13 fixed thereto, see Fig. 3, and rotated at the proper intervals by a fan gear 14 carried by the shaft 10.

For intermittently rotating the work carrying spindles a ring gear 15 is provided having internal teeth 16 in mesh with gears 16' carried by the work spindles, see Fig. 14. This ring gear, which is loose with relation to the turret so that the turret willl turn independently of this gear, is provided with external teeth 17 coöperating with another fan gear 18 carried by the shaft 10, which fan gear in the present instance is provided with one tooth only, this being sufficient for the purpose.

The milling tool slide 20 is shown as a compound slide mounted for sliding movement upon the base 2 and located in front but at one side of the revoluble turret, such reciprocatory movement being imparted thereto by means of a cam drum 21 mounted upon a cam shaft 22, the cams 23 of which engage a roller carried by a downwardly projecting stud 24 fixed to the slide. For rotating this cam shaft 22 it is provided with a worm wheel 25 in mesh with a worm shaft 26, to which motion is imparted from any suitable source of power through the medium of a belt running to the pulleys 27 and 28, one of which is a fast pulley and the other a loose pulley. Coöperating with these pulleys is a suitable belt shifter 29 operated through the medium of cams 30 on the cam shaft 22 in the usual manner. At the rear of the milling tool slide is a stop screw 31 and bunter 32, which regulate the position of the slide, the screw being carried by an arm 33 fixed to the tool slide while the bunter is carried by a fixed part of the machine.

The milling tool carrier comprises a vertically movable slide or head 35 supported on an upright part of the tool slide 20 and provided at its front side with three sets of bearings 36, 37 and 38 for the reception of the milling tool shafts 39, 40 and 41. Each milling tool spindle or shaft bearing consists of a pair of sleeves spaced apart for the reception intermediate thereof of an adjusting sleeve 42 having internal threads 43 coöperating with threads 44 of the milling tool shaft or spindle sleeve. The milling tool spindles are provided with gears 45, 46 and 47. The gears 45 and 46 are in mesh with a gear 48 mounted on a stud of the tool head, and to which gear 48 motion is imparted from a gear 49 carried on a driving shaft 50 supported on the tool slide and to which driving shaft is secured a driving pulley 51, which may be connected by a belt with any suitable source of power. By this means the two upper gears are rotated while the intermediate gear 46 imparts motion to the lower gear 47 by an intermediate gear 52 carried on a stud of the tool head, whereby the milling tools 53 positioned in the ends of the shafts or spindles are rotated in the desired manner.

The three milling tool spindles are spaced apart and in the present improvement are located with their axes in parallel planes so that they will be in position to engage the work carried by the work spindles nearest thereto. The upper and lower milling tool spindles are of the same length, but the intermediate spindle is somewhat shorter than its companion spindles so that they are circularly arranged with the middle spindle in a position to coöperate with the work carried by the work spindle which is farthest to the left at the time the milling tools are in operation, the exact length of this intermediate tool spindle being determined by the circular spacing of the work spindles in the cylinder.

For imparting an up and down movement to the milling tool head so that the cutters will cut when the slide moves down the head is provided with a rack 54 fastened thereto, and in mesh with the teeth of this rack is a gear 55 carried on the tool head, which in turn is in mesh with a rack 56 secured to a rod 57 running under the milling tool slide. This rod is linked to the base, see Figs. 2 and 3, and is provided with a stud 58 having a roller 59 coöperating with cams 60 mounted on a cam drum 61 carried on the shaft 22, whereby reciprocatory movement will be imparted to the rod and the rack carried thereby so that the cutter head will be moved up and down, the cams on the drum 61 being so formed that the tool head will be moved down slowly and up quickly and consequently as little time will be lost as possible in the milling operations.

As the cutters are carried downward by the tool head one flat on each blank of the three work spindles adjacent to the cutters is milled off, succeeding which milling operation and while the turret is still stationary, the spindles are rotated through the ring gear 15 and the one toothed fan gear hereinbefore referred to, whereupon the blanks are in position to be again cut, and as the milling tool head goes down again another flat is cut on the three blanks, succeeding which the turret is rotated by means of the gear 13 and fan gear 14 to index the turret and thereby carry the several blanks into a different position, whereupon the foregoing operations are repeated.

The foregoing is clearly illustrated in Figs. 5 to 10, in which it will be observed that a blank in the upper spindle at the left has been milled. In Fig. 6 the spindle has been rotated while the turret remained stationary and a second flat is cut, whereupon the turret is rotated to carry this blank into position to be engaged by the intermediate milling tool, while another blank is carried into position to have the first flat formed thereon, see Fig. 7, and as the milling tools move down it will be observed that the intermediate milling tool cuts the third flat while the upper milling tool cuts the first flat upon the new blank. Thereupon the spindles are rotated so that the new blank is brought into position to have the second flat cut thereon, while the intermediate blank is carried into position to have the fourth flat cut thereon, see Fig. 8, succeeding which the turret is rotated to carry the original blank into position to be engaged by the lowest milling tool, which cuts the fifth flat on the blank, while the third flat is cut on the intermediate blank by the intermediate milling tool and a new blank is brought into position to be cut by the upper milling tool, as shown in Fig. 9, succeeding which the work spindles are again rotated as shown in Fig. 10, so that the lower blank receives its sixth cut, the intermediate blank its fourth cut and the upper blank its second cut. So that when the turret is indexed three times one blank has received six milling cuts, another four and another two, and therefore on the indexing of the turret half way around a complete nut is milled with six flats, it being observed that the spindles are rotated once after each indexing of the turret and that on each indexing of the turret a flat is cut upon three blanks, and on each rotation of the spindles after such indexing of the turret another flat is cut on the same blanks, so that every time the turret is indexed a completed nut is formed, which may be ejected or removed from its chuck in any suitable manner.

In practice the mechanisms are so organized and timed that the rotation of the work spindles and indexing of the turret may take place while the milling tool head is moving upward, thus saving loss of time.

From the foregoing it will be observed that the milling tools are located in circular arrangement, so that each time the milling tool head goes down a slab is cut on three blanks, and as the head moves upward the work spindles are rotated one-sixth, six such spindles being shown in the present improvement, while the turret remains stationary, and as the milling tool head goes down another slab is cut on the same three blanks, thus making two slabs on three nut blanks succeeding which the turret is rotated or indexed. Therefore, at each complete indexing of the turret six cuts are obtained on a blank.

In order to properly locate the spindles during the indexing or rotation thereof suitable means may be used. In the present instance this comprises plungers 65, one for each spindle, which plungers are spring actuated and are housed in the turret or cylinder and coöperate with index plates 66 on the spindles at the required intervals. These plates are provided with notches 67 spaced in a circular division of six. The plungers tend to hold the spindles against play during the milling operations.

I claim as my invention:

1. In an automatic multiple spindle machine, the combination of an intermittently revoluble turret, means for automatically indexing it, parallelly located blank holding spindles carried by the turret, means for intermittently rotating the spindles after each indexing of the turret, and means for working on the blanks carried by the spindles.

2. In an automatic multiple spindle machine, the combination of an intermittently revoluble turret, means for automatically indexing it, parallelly located blank holding spindles carried by the turret, means for intermittently rotating the spindles after each indexing of the turret, and a plurality of means for simultaneously working on a plurality of blanks carried by the spindles.

3. In an automatic multiple spindle machine, the combination of an intermittently revoluble turret, means for automatically indexing it, a series of parallelly located blank holding spindles carried by the turret, means for intermittently rotating the spindles after each indexing of the turret, and a series of means having simultaneously a movement transversely of the axes of the spindles for simultaneously working on three blanks carried by the spindles.

4. In an automatic multiple spindle machine, the combination of an intermittently revoluble turret, means for automatically indexing it, a series of parallelly located blank holding spindles carried by the turret, means for intermittently rotating the spindles after each indexing of the turret, a series of means having simultaneously a movement transversely of the axes of the spindles for simultaneously working on three blanks carried by the spindles, means for actuating said last means, and means for automatically reciprocating said blank working means toward and from the spindles.

5. In an automatic multiple spindle milling machine, the combination of an intermittently revoluble turret, means for automatically indexing it, a series of parallelly located blank holding spindles carried by the turret, means for intermittently rotating the spindles after each indexing of the turret, a reciprocatory slide, a series of tools carried by said slide and operative simultaneously upon three blanks carried by the spindles, means for raising and lowering said slide transversely of the axes of the spindles, and means for reciprocating said slide toward and from the spindles.

6. In an automatic multiple spindle machine, the combination of an intermittently revoluble turret, means for automatically indexing it, parallelly located blank holding spindles carried by the turret, means for intermittently rotating the spindles after each indexing of the turret, a reciprocatory slide, a plurality of cutters carried by the slide and operative simultaneously upon a plurality of blanks carried by the spindles, and means for reciprocating said slide to carry the cutters transversely of the axes of the spindles, said cutters having their axes located in parallel planes transversely to the turret axis and spaced apart to correspond with the distance between the spindles of the turret.

7. In an automatic multiple spindle machine, the combination of an intermittently revoluble turret, means for automatically indexing it, parallelly located blank holding spindles carried by the turret, means for intermittently rotating the spindles after each indexing of the turret, a reciprocatory slide, a plurality of cutters carried by the slide and operative simultaneously upon a plurality of blanks carried by the spindles, means for reciprocating said slide to carry the cutters transversely of the axes of the spindles, said cutters being located in circular arrangement with their axes in parallel planes transversely of the turret axis and spaced apart to correspond with the distance between the spindles of the turret, and means for reciprocating said slide toward and from the spindles and means for rotating said cutters.

8. In an automatic multiple spindle milling machine, the combination of an intermittently revoluble turret, means for automatically indexing it, parallelly located blank holding spindles carried by the turret, means for intermittently rotating the spindles after each indexing of the turret, a reciprocatory slide, a plurality of milling cutters carried by said slide and located in circular arrangement with their axes in parallel planes transversely to the turret axis and spaced apart to correspond with the distance between the spindles of the turret and operative simultaneously upon a plurality of blanks carried by the spindles, and means for reciprocating said slide to carry the cutters transversely of the axes of the spindles.

9. In an automatic multiple spindle milling machine, the combination of an intermittently revoluble turret, means for automatically indexing it, a series of parallelly located blank holding spindles carried by the turret, means for intermittently rotating the spindles after each indexing of the turret, a reciprocatory slide, a series of milling cutters carried by said slide and with their axes located in circular arrangement in parallel planes transversely to the turret axis and spaced apart to correspond with the distance between the spindles of the turret and operative simultaneously upon three blanks carried by the spindles, means for reciprocating said slide simultaneously to carry the cutters transversely of the axes of the spindles, and means for reciprocating the cutters toward and from the turret.

10. In an automatic multiple spindle machine, the combination of an intermittently revoluble turret, means for automatically indexing it, parallelly located blank holding spindles carried by the turret, means for intermittently rotating the spindles after each indexing of the turret, means coöperating with the spindles for locating them in their proper positions, and means for working on the blanks carried by the spindles.

11. In an automatic multiple spindle machine, the combination of an intermittently revoluble turret, means for automatically indexing it, parallelly located blank holding spindles carried by the turret, means for intermittently rotating the spindles after each indexing of the turret, means coöperating with the spindles for locating them in their proper positions, a reciprocatory slide, a plurality of tools carried by said slide and located in parallel planes and spaced apart to correspond with the distance between the spindles of the turret and effective to simultaneously operate upon a plurality of blanks carried by the spindles, and means for reciprocating said slide to carry the tools transversely of the axes of the spindles.

12. In an automatic multiple spindle milling machine, the combination of an intermittently revoluble turret, means for automatically indexing it, a series of parallelly located blank holding spindles carried by the turret, means for intermittently rotating the spindles after each indexing of the turret, means coöperating with the spindles for locating them in their proper positions, a reciprocatory slide, a series of tools carried by said slide and located with their axes in parallel planes transversely to the turret axis and spaced apart to correspond with the distance between the spindles of the turret and effective to simultaneously operate upon three blanks carried by the spindles, means for reciprocating said slide to carry the tools transversely of the axes of the spindles, and means for rotating said tools.

13. In an automatic multiple spindle machine, the combination of an intermittently revoluble turret, parallelly located blank holding spindles carried by the turret, means for intermittently rotating the spindles a partial rotation after each indexing of the turret, means for automatically indexing the turret after each rotation of the spindles, and means for working on the blanks carried by the spindles and comprising a plurality of tools located with their axes in parallel planes and spaced apart to correspond with the distance between the spindles of the turret, a reciprocatory slide carrying said tools, and means for reciprocating said slide.

14. In an automatic multiple spindle machine, the combination of an intermittently revoluble turret, a series of parallelly located blank holding spindles carried by the turret, means for intermittently rotating the spindles a partial rotation after each indexing of the turret, means for automatically indexing the turret after each rotation of the spindles, means for working simultaneously on three blanks carried by the spindles and comprising a series of tools located with their axes in parallel planes transversely to the turret axis and spaced apart to correspond with the distance between the spindles of the turret, a reciprocatory slide carrying said tools, means for reciprocating said slide, means for rotating said tools, and means for reciprocating the tools toward and from the turret.

15. In an automatic multiple spindle machine, the combination of an intermittently revoluble turret, a series of six parallelly located blank holding spindles carried by the turret, means for intermittently rotating the spindles one-sixth of a turn after each indexing of the turret, means for indexing the turret after each rotation of the spindles, a reciprocatory slide, a plurality of cutters carried by the slide and located with their axes in parallel planes and spaced apart to correspond with the distance between the spindles of the turret, means for rotating the cutters, and means for reciprocating the slide to carry the cutters transversely of the axes of the spindles.

16. In an automatic multiple spindle milling machine, the combination of an intermittently revoluble turret, a series of six parallelly located blank holding spindles carried by the turret and located in circular arrangement, means for intermittently rotating the spindles one-sixth of a turn after each indexing of the turret, means for automatically indexing the turret after each rotation of the spindles, a tool carrier supported for reciprocation, three milling cutters carried by said carrier and located in circular arrangement with their axes in parallel planes transversely to the turret axis and spaced apart to correspond with the distance between the spindles of the turret, means for reciprocating said cutters transversely of the axes of the spindles thereby to cut three blanks simultaneously, means for rotating said cutters, and means for reciprocating said cutters toward and from the turret.

17. In an automatic multiple spindle milling machine, the combination of an intermittently revoluble turret, a series of six parallelly located blank holding spindles carried by the turret and located in circular arrangement, means for intermittently rotating the spindles one-sixth of a turn after each indexing of the turret, means for automatically indexing the turret after each rotation of the spindles, a tool carrier supported for reciprocation, three milling cutters carried by said carrier and located in circular arrangement with their axes in parallel planes and spaced apart to correspond with the distance between the spindles of the turret, means for reciprocating said cutters transversely of the axes of the spindles thereby to cut three blanks simultaneously, means for rotating said cutters, means for reciprocating said cutters toward and from the turret, and means for locating the spindles when the same are rotated.

18. In an automatic multiple spindle milling machine, the combination of an intermittently revoluble turret, a series of six parallelly located blank holding spindles carried by the turret and located in circular arrangement, means for intermittently rotating the spindles one-sixth of a turn after each indexing of the turret, means for automatically indexing the turret after each rotation of the spindles, a tool carrier supported for reciprocation, three milling cutters carried by said carrier and located in circular arrangement with their axes in parallel planes and spaced apart to correspond with the distance between the spindles of the turret, means for reciprocating said cutters transversely of the axes of the spindles thereby to cut three blanks simultaneously, means for rotating said cutters, means for reciprocating said cutters toward and from the turret, and means for locating the spindles when the same are rotated and comprising plungers carried by the turret and index plates carried by the spindles.

19. In an automatic multiple spindle machine, the combination of an intermittently revoluble turret, means for automatically indexing it, blank holding spindles carried by the turret, means for intermittently rotating the spindles a partial turn after each indexing of the turret and comprising a ring gear having internal and external teeth, gears carried by the spindles and meshing with the internal teeth of said gear, a fan gear meshing with the external teeth of said gear and means for rotating said fan gear to intermittently engage said ring gear, and means for simultaneously working on a plurality of blanks carried by the spindles.

20. In an automatic multiple spindle machine, the combination of an intermittently revoluble turret, means for automatically indexing it and comprising a gear fixed to the turret and a fan gear coöperating therewith, a shaft on which said fan gear is mounted, means for rotating said shaft, blank holding spindles carried by the turret, means for intermittently rotating the spindles a partial turn intermediate each indexing of the turret and comprising a ring gear having external and internal teeth, gears carried by the spindles and in mesh with said internal teeth, and a fan gear mounted on said shaft and adapted to intermittently engage said external teeth to intermittently rotate the spindles.

Signed at Cleveland, Ohio, this 10th day of May, 1911.

OSCAR A. SMITH.

Witnesses:
A. W. HENN,
E. C. WOOLGAR.